United States Patent
Chee

(10) Patent No.: US 8,026,707 B2
(45) Date of Patent: Sep. 27, 2011

(54) CIRCUIT SYSTEM AND METHOD FOR REDUCING AN IN-RUSH CURRENT

(75) Inventor: San Hwa Chee, Fremont, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 528 days.

(21) Appl. No.: 11/847,196

(22) Filed: Aug. 29, 2007

(65) Prior Publication Data

US 2009/0058378 A1 Mar. 5, 2009

(51) Int. Cl.
*G05F 1/618* (2006.01)
(52) U.S. Cl. .................. 323/284; 323/908; 323/901
(58) Field of Classification Search .............. 323/284, 323/901, 908, 238, 321, 288, 282, 223; 363/49, 363/50, 127
See application file for complete search history.

(56) References Cited

U.S. PATENT DOCUMENTS

| | | | |
|---|---|---|---|
| 5,233,508 A * | 8/1993 | Yamamura et al. | 363/49 |
| 6,166,528 A | 12/2000 | Rossetti et al. | 323/283 |
| 6,377,480 B1 * | 4/2002 | Sase et al. | 363/49 |
| 6,515,880 B1 * | 2/2003 | Evans et al. | 363/49 |
| 6,661,216 B1 * | 12/2003 | Grant et al. | 323/282 |
| 6,943,533 B2 * | 9/2005 | Okuno | 323/222 |
| 6,969,977 B1 * | 11/2005 | Smith | 323/222 |
| 7,157,892 B1 * | 1/2007 | Ritter | 323/284 |
| 7,453,287 B2 * | 11/2008 | Umeki | 326/82 |
| 2005/0258808 A1 * | 11/2005 | Chen et al. | 323/222 |
| 2005/0275388 A1 * | 12/2005 | Takimoto et al. | 323/272 |
| 2006/0208718 A1 * | 9/2006 | Nitta et al. | 323/288 |

* cited by examiner

*Primary Examiner* — Harry Behm
(74) *Attorney, Agent, or Firm* — Zilka-Kotab, PC

(57) ABSTRACT

A circuit is provided including an output stage with a pair of transistors. Further provided is a control circuit in communication with the output stage. The control circuit is capable of controlling a duration in which at least one of the transistors is actuated for reducing an in-rush current.

23 Claims, 5 Drawing Sheets

CIRCUIT SYSTEM AND METHOD FOR REDUCING AN IN-RUSH CURRENT

FIELD OF THE INVENTION

The present invention relates to regulators, and more particularly to switching regulators.

BACKGROUND

Switching regulators operate to switch a device on and of, during use. To accomplish this, a typical switching regulator may include an output stage with upper and lower transistors (e.g. MOSFETs, etc.) having interconnected gates serving as an input and interconnected drains serving as an output. In use, an "in-rush" current limiter is typically applied to switch the regulator to prevent excessive input current during startup.

Prior art FIG. 1 is a timing diagram 100 showing such an in-rush current 102 over time. As shown, such in-rush current 102 ramps up after receiving an appropriate signal from a current comparator, at various trip points 106. Such ramp up continues until a leading edge of a subsequent clock signal 104 is reached.

As shown, the ramp up of the in-rush current 102 can be close to a full clock cycle. In such situations, the in-rush current can ramp up to a very significant value. It is often desirable, however, to limit such in-rush current 102, hence the need of providing a "soft start." There is thus a need for addressing these and/or other issues associated with the prior art.

SUMMARY

A circuit is provided including an output stage with a pair of transistors. Further provided is a control circuit in communication with the output stage. The control circuit is capable of controlling a duration in which at least one of the transistors is actuated for reducing an in-rush current.

BRIEF DESCRIPTION OF THE DRAWINGS

Prior art

DETAILED DESCRIPTION

Figure 1:
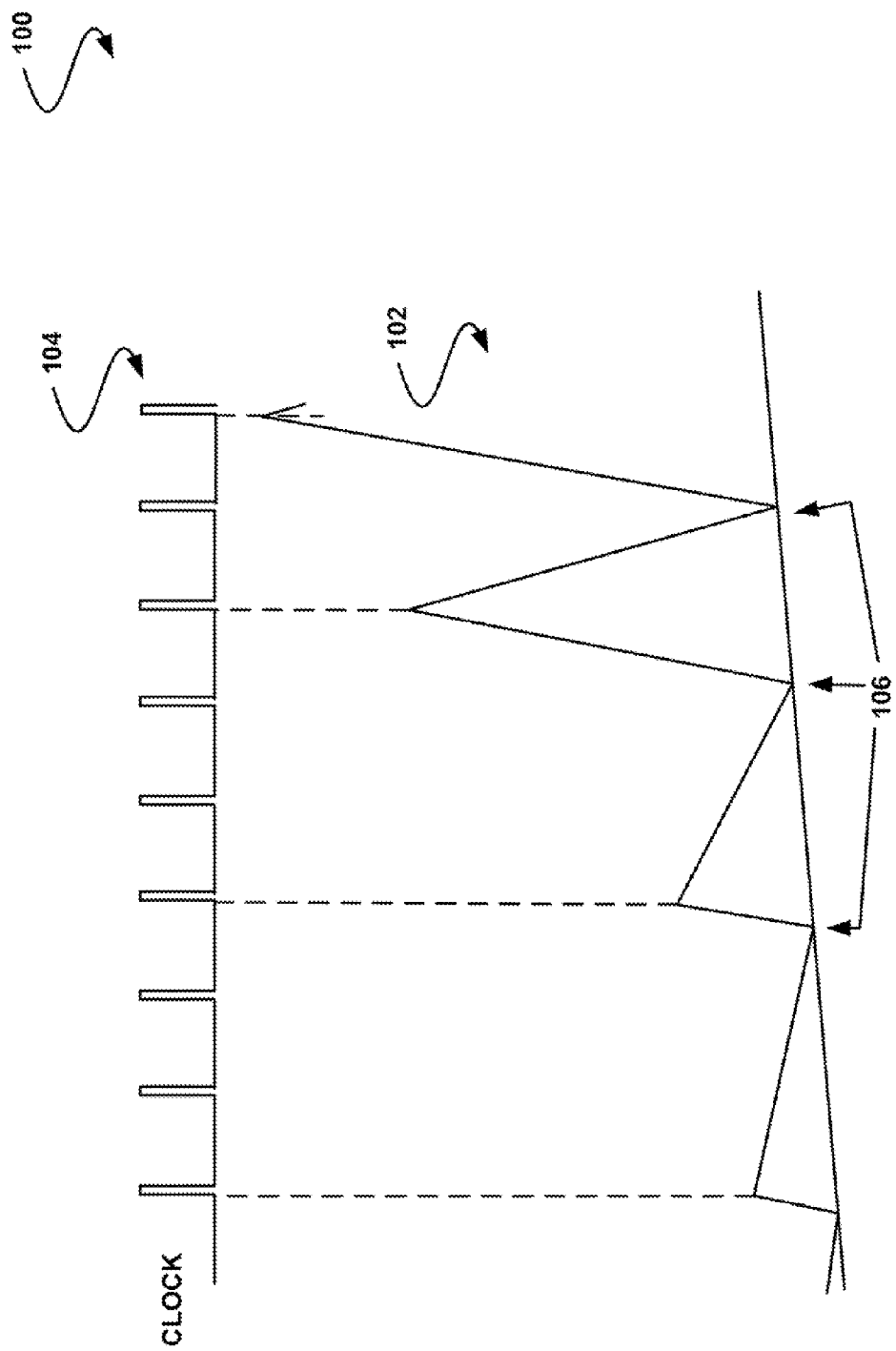
FIG. 1 is a timing diagram showing such an in-rush current over time.
Figure 2:
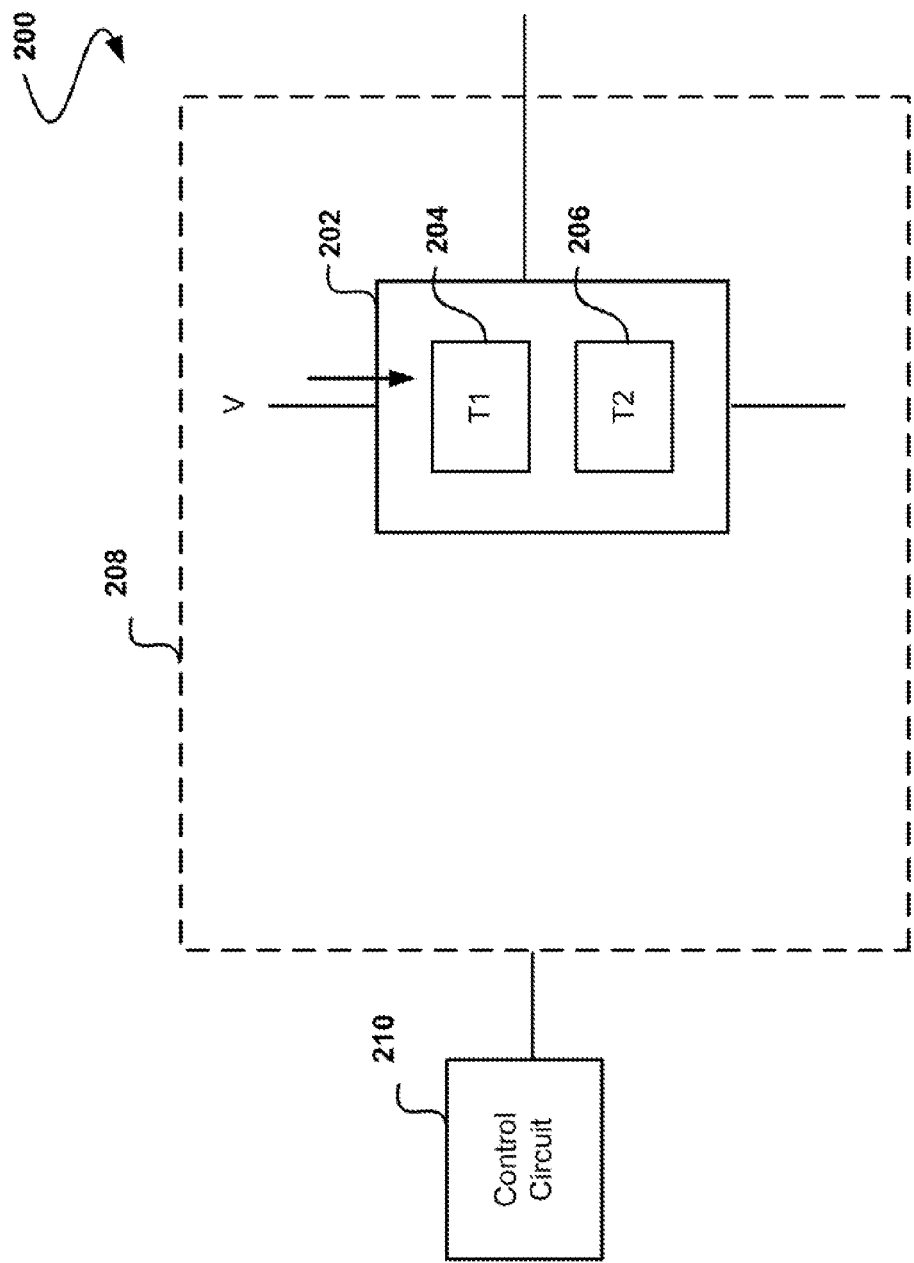
FIG. 2 shows a circuit for reducing an in-rush current, in accordance with one embodiment.

FIG. 2 shows a circuit 200 for reducing an in-rush current, in accordance with one embodiment. As shown, an output stage 202 is provided including a first transistor 204 and a second transistor 206. It should be noted that the first transistor 204 and the second transistor 206 may take any form. For example, the first transistor 204 and/or second transistor 206 may include a p-type transistor or n-type transistor. Further, in one embodiment, the transistors 204, 206 may include MOSFET transistors but, of course, other embodiments are contemplated where other transistor types are employed.

Further, it should be noted that the transistors 204, 206 may be interconnected in any desired manner. For example, while not shown, the first transistor 204 may include an upper transistor coupled to a voltage source, and the second transistor 206 may include a lower transistor. Still yet, the transistors 204, 206 may have interconnected gates serving as an input and interconnected drains serving as an output. Of course, other configurations are contemplated.

Still yet, the output stage 202 may, in one embodiment, be a component of a larger circuit 208 that drives the output stage 202. For example, in one embodiment, the output stage 202 may be a component of a regulator (e.g. a direct current switching regulator, etc.). Of course, the output stage 202 may be employed, in any desired circuit where there is a desire for reducing an in-rush current.

With continuing reference to FIG. 2, a control circuit 210 is in communication with the output stage 202. Such communication may be a direct or indirect communication that may or may not involve various components of the circuit 208. Further, while the control circuit 210 is shown to be separate from the circuit 208, other embodiments are contemplated where the control circuit 210 is a component of the circuit 208, and possibly even the output stage 202.

In use, the control circuit 210 is capable of controlling a duration in which at least one of the transistors 204, 206 is actuated for reducing an in-rush current. In one embodiment, the control circuit 210 is capable of controlling a duration in which the first transistor 204 is actuated for such purpose. In the context of the present description, such in-rush current may refer to any current that represents a maximum input current drawn by the actuation of at least one of the transistors 204, 206 of the output stage 202. In an embodiment where the circuit 208 includes a switching regulator, such in-rush current may refer to a current required to switch the output stage 202. By reducing such in-rush current, a "soft start" may thus be afforded. Further, such in-rush current control may, in one embodiment, be provided in such a way that the control automatically abates and settles to system requirements, as desired.

Further, it should be noted that the in-rush current may be reduced in any desired manner. Just by way of example, the in-rush current may be reduced by reducing a time in which the in-rush current is allowed to ramp up. This may be accomplished, for example, by reducing a duration in which at least one of the transistors 204, 206 is actuated. More information will now be set forth regarding one exemplary way in which the in-rush current may be reduced in accordance with a different embodiment.

Figure 3:
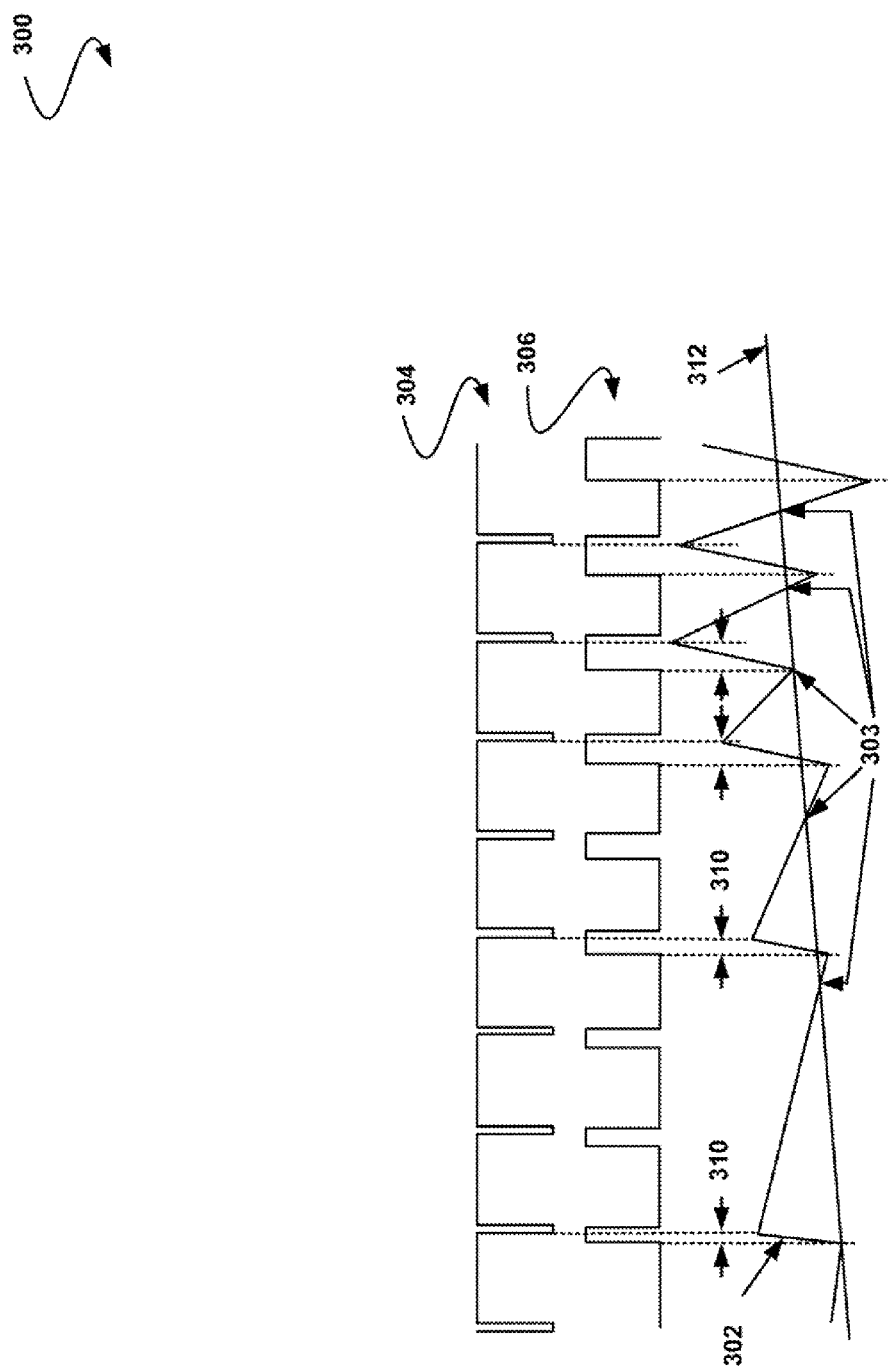
FIG. 3 is a timing diagram showing an in-rush current over time as a function of a clock signal and a separate trip signal.

FIG. 3 is a timing diagram 300 showing an in-rush current 302 over time as a function of a clock signal 304 and a separate trip signal 306. As an option, the present timing diagram 300 may represent operation of the circuit 200 of FIG. 2. Of course, however, the timing diagram 300 may be implemented in any desired environment. It should also be noted that the aforementioned definitions may apply during the present description.

In the present embodiment, the in-rush current 302 ramps during a time period that does not necessarily start with a signal 303 from a comparator, etc. Instead, the in-rush current ramp up time may be reduced by utilizing a separate trip signal 306 for defining the start of the ramp up time. As shown, such ramp up time may terminate with a leading edge of a subsequent clock pulse 304.

As an option, a duration 310 defined by leading edges of the separate trip signal 306 and the corresponding subsequent clock pulse 304 may be variable, as shown. For example, as a starting point 312 of the in-rush current 302 ramps up, such duration 310 may be increased, in the manner shown, to control the in-rush current 302 accordingly.

More illustrative information will now be set forth regarding various optional architectures and features with which the foregoing framework may or may not be implemented, per the desires of the user. To accomplish the foregoing functionality in accordance with one embodiment, the control circuit may include a control circuit comparator that matches a separate oscillator comparator of the circuit which remains in communication with the output stage. In use, such control circuit comparator may serve to control when the oscillator comparator communicates with the output stage. As an option, such control may be provided by way of a NAND gate or the like.

It should be strongly noted that the following information is set forth for illustrative purposes and should not be construed as limiting in any manner. Any of the following features may be optionally incorporated with or without the exclusion of other features described.

Figure 4:
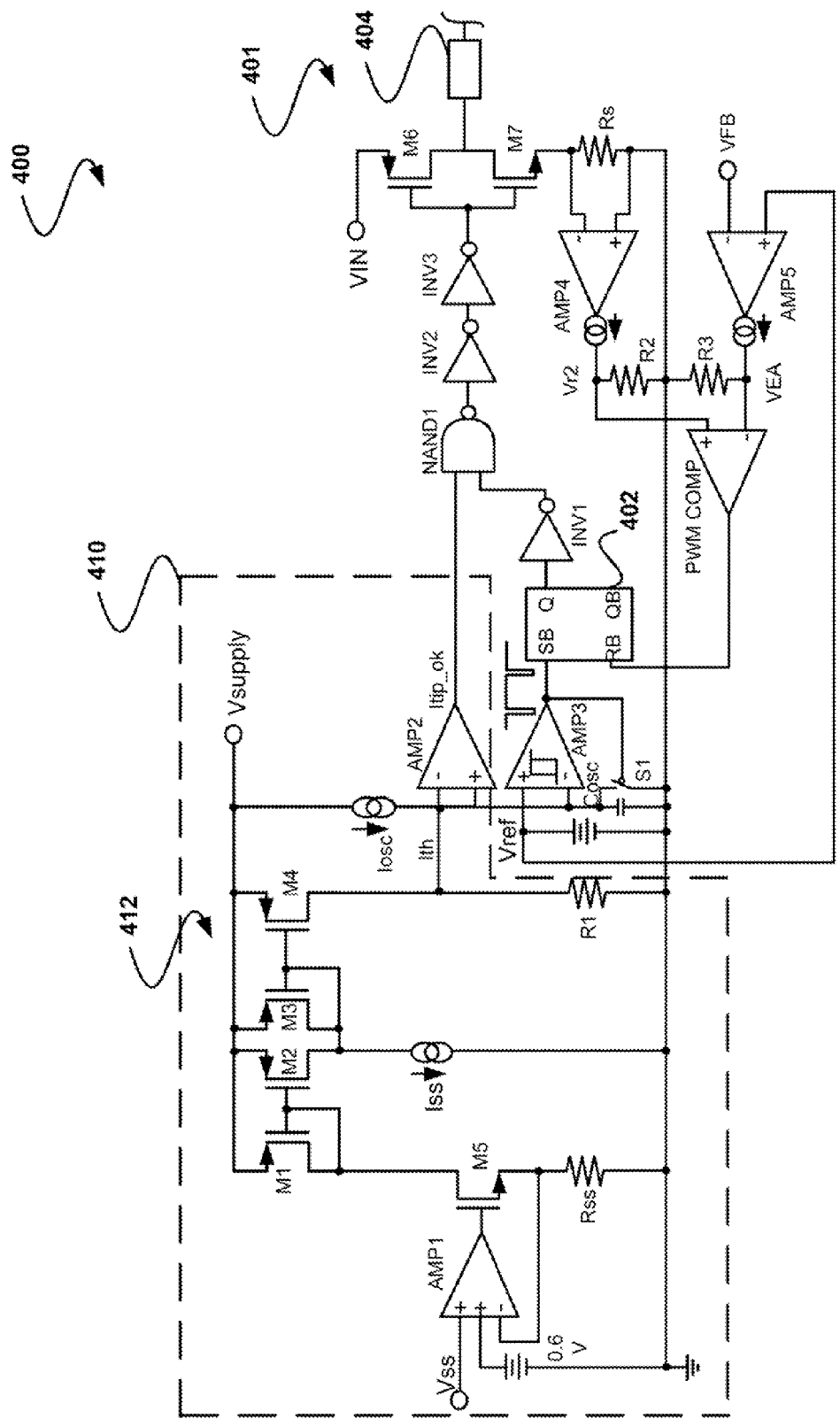
FIG. 4 shows a circuit for reducing an in-rush current, in accordance with another embodiment.

FIG. 4 shows a circuit 400 for reducing an in-rush current, in accordance with another embodiment. As an option, the present circuit 400 may be implemented in the context of the functionality and architecture of FIGS. 2-3. Of course, however, the circuit 400 may be implemented in any desired environment. Again, the aforementioned definitions may apply during the present description.

As shown, an oscillator current source Iosc is connected to a first node of an oscillator capacitor Cosc. A negative input of an operational amplifier AMP3 is also connected to the first node of the oscillator capacitor Cosc. The amplifier AMP3 is configured to operate as a comparator.

Additionally, a first node of a switch S1 is connected to the first node of the oscillator capacitor Cosc. Connected to a positive input of the amplifier AMP3 is a reference voltage source Vref. By this design, the operational amplifier AMP3 serves to generate a negative pulse signal. See, for example, the clock signal 304 of FIG. 3. This is accomplished by charging the oscillator capacitor Cosc when the switch S1 is open, until it reaches the reference voltage source Vref, at which time such pulse is generated.

An output of the amplifier AMP3 is connected to a set input SB of a latch 402. An output Q of the latch 402 is connected to an input of an inverter INV1. An output of the inverter INV1 is connected to a first input of a NAND gate NAND1. An output of the NAND gate NAND1 is connected to two series-connected inverters INV2 and INV3. An output of the inverter INV3 is connected to an output stage 401.

In particulars the inverter INV3 is connected to gates of two MOSFETs M6 and M7. As illustrated, drains of the MOSFETs M6 and M1 are both connected to an inductor 404. Further, a source of the MOSFET M6 is connected to a voltage source VIN.

In use, the aforementioned negative pulse from the amplifier AMP3 sets the output Q=1 on the latch 492 which, in turn, provides a logical "0" at an output of the inverter INV1. Such logical "0" thus overrides any value on a second input of the NAND gate NAND1, thus providing: a logical "1" at the output of the NAND gate NAND1, a logical "0" at an output of the inverter INV2, and a logical "1" at an output of the inverter INV3. Such logical "1" at the output of the inverter INV3 thus turns on the MOSFET M7 of the output stage 401, as well as turn off the MOSFET M6 of the output stage 401.

It should be noted that, before the MOSFET M7 of the output stage 401 is turned on, current flows through the MOSFET M6 and the inductor 404. When, however, the MOSFET M7 of the output stage 401 is turned on, current flows through the MOSFET M7 and the inductor 404, as will soon become apparent. After the MOSFET M7 is turned on in such manner, the inductor current through the inductor 404 begins to decay. See, for example, the inductor current 302 of FIG. 3.

With continuing reference to FIG. 4, a source of the MOSFET M7 is connected to a first node of a resistor Rs and a negative input of a current sensing amplifier AMP4 which, in one embodiment, may include a transconductance amplifier. A positive input of the current sensing amplifier AMP4 and a second node of the resistor Rs are connected to ground, in the manner shown. An output of the current sensing amplifier AMP4 is connected to a resistor R2 and a positive input of a pulse width modulation (PWM) comparator PWM COMP.

Connected to a negative input of the comparator PWM COMP is an output of an error amplifier AMP5 and a first node of a resistor R3. A positive input of the error amplifier AMP5 is connected to the voltage reference Vref. A negative input of the error amplifier AMP5 is connected to a voltage source VFB. An output of the comparator PWM COMP is connected to a reset input RB of the latch 402.

As mentioned earlier, current flows through the MOSFET M7 and the inductor 404, when the MOSFET M7 of the output stage 401 is turned on. Such current creates a voltage drop across resistor Rs which, in turn, creates a current at an output of the current sensing amplifier AMP4 and a corresponding voltage (Vr2) across the resistor R2. Such voltage Vr2 across the resistor R2 may then be compared with a voltage (VEA) across the resistor R3, utilizing the comparator PWM COMP.

As set forth above, the current flow through the MOSFET M7 decays after such MOSFET M1 is turned on. Thus, upon such current flow decreasing a predetermined amount (such that Vr2<VEA), a negative pulse at an output of the comparator PWM COMP may trigger a reset input RB of the latch 402, thus making Q=0 on the latch 402. At this point, the state of the output stage 401 will remain the same until the second input of the NAND gate NAND1 goes high.

By this design, a control circuit 410 may be used to control such second input of the NAND gate NAND1, for the purpose of controlling when the MOSFET M7 is turned off and the MOSFET M6 is turned on. Therefore, by controlling a duration in which the MOSFET M6 is turned on, such control circuit 410 may be used to reduce in-rush current. To afford such control, the control circuit 410 includes a plurality of additional components, as shown.

Specifically, the control circuit 410 includes an amplifier AMP2. For reasons that will soon become apparent, the amplifier AMP2 may be designed to match (e.g. substantially match, exactly match, etc.) the amplifier AMP3. As shown, a positive input to the amplifier AMP2 is connected to the first node of the oscillator capacitor Cosc. An output of the amplifier AMP2 is connected to the second input of the NAND gate NAND1. A negative input of the amplifier AMP2 is connected to a portion of the control circuit 410 which generates a threshold signal Ith. In use, the amplifier AMP2 operates as a comparator.

As shown, such control circuit 410 includes a voltage supply Vss that is connected to a first positive input of an amplifier AMP1. A second positive input of the amplifier AMP1 is connected to a voltage source (e.g. 0.6V). A negative input of the amplifier AMP1 is connected to a first node of a resistor Rss.

An output of the amplifier AMP1 is connected to a gate of a MOSFET M5. A source of the MOSFET M5 is connected to the first node of the resistor Rss. A drain of the MOSFET M5 is connected to a current mirror 412. Specifically, the drain of the MOSFET M5 is connected to a gate and drain of a MOSFET M1, in addition to a gate of a MOSFET M2. Sources of the MOSFETs M1 and M2 are connected to a voltage source Vsupply.

A drain of the MOSFET M2 is connected to a current source Iss. Furthermore, a gate and drain of a MOSFET M3, as well as a gate of a MOSFET M4, are connected to the current source Iss. Additionally, sources of the MOSFETs M3 and M4 are connected to the voltage source Vsupply. A drain of the MOSFET M4 is connected to a first node of a resistor R1. Furthermore, the drain of the MOSFET M4 and the first node of the resistor R1 are connected to the negative input of the amplifier AMP2.

An illustrative example of the overall operation of the circuit 400 and the manner in which the above-described control circuit 410 serves to reduce in-rush current will now be set forth. As mentioned earlier, a clock signal is generated by the amplifier AMP3, the oscillator capacitor Cosc, the current source Iosc, and the switch S1. In particular, the current source Iosc charges the oscillator capacitor Cosc in a linear function. When the voltage at the negative input of the amplifier AMP3 reaches the positive input value of the reference voltage Vref, the output of the amplifier AMP3 goes low and turns on the switch S1.

This, in turn, discharges the voltage of the oscillator capacitor Cosc to zero volts, and the output of the amplifier AMP3 changes to a logic "high," thus opening the switch S1. The process of charging the oscillator capacitor Cosc subsequently repeats again. By this design, the voltage at the negative input of the amplifier AMP3 takes the form of a saw tooth signal (generated using the capacitor Cosc), and the output of the amplifier AMP3 pulses low in a periodic manner, which is then used as a clock for the circuit 400.

The output of the amplifier AMP3 is then applied to the set input SB of the latch 402. Each time the set input SB goes low, the output Q goes high, and thus the output of the first inverter INV1 goes low. Regardless of a status of the second input to the NAND gate NAND1, such logic low from the first inverter INV1 propagates through the second and third inverters INV2 and INV3, finally turning on the MOSFET M7.

Upon the MOSFET M7 turning on, current from the inductor 404 flows upward from the ground towards a source of the MOSFET M7. A voltage drop across the sensing resistor Rs is thus created and applied to the current sensing amplifier AMP4. Since such current sensing amplifier AMP4 is a transconductance amplifier, a current proportional to the voltage across such resistor Rs flows into the resistor R2, creating a voltage VR2.

This voltage VR2 is compared to the output voltage VEA of the error amplifier AMP5. Initially, when the MOSFET M7 is turned on, the voltage VR2 is higher than VEA, and VR2 gradually decays until it falls below VEA. When this happens, the output of the comparator PWM COMP goes low, resetting the latch 402. The output Q of the latch 402 thus goes low and, with the amplifier AMP2 output high, the signal propagates through the NAND gate NAND1 and inverter gates INV2, INV3. This then turns off the MOSFET M7 and turns on the MOSFET M6. At this point, current flows from the voltage supply VIN and out to the inductor 404. The MOSFET M6 remains on until the clock sets the latch 402 and the above-mentioned process repeats again.

To this end, the clock initiates the activation of the MOSFET M1 and the current through the sensing resistor Rs dictates when the MOSFET M7 is turned off and the MOSFET M6 is turned on. It should be noted that such operation assumes that the output of the amplifier AMP2 is high.

Turning now to the operation of the control circuit 410, it will now be described how such control circuit 410 reduces in-rush current, thereby providing a "soft start." To afford such soft start scheme, the on-time of the MOSFET M6 is controlled and gradually lengthened until it automatically settles into the on-time required by the circuit 400. This is achieved by generating the threshold signal Ith that ramps down from a value of the reference voltage Vref and is then compared with the oscillator voltage Vcosc. The ramp rate of the threshold signal Ith is controlled by the soft start voltage Vss and exhibits an opposite gradient.

The output of such comparison thus takes the form of an Itrip_ok signal which may then be used to force the MOSFET M7 to remain on. If oscillator voltage Vcosc is lower than the threshold signal Ith, the output of the amplifier AMP2 is low. In this condition, the MOSFET M7 is forced to remain on even though the latch 402 has been reset by the comparator PWM COMP, signifying the remaining circuit 400 is working to turn off the MOSFET M7 and turn on the MOSFET M6.

When the oscillator voltage Vcosc finally exceeds the threshold signal Ith, the output of the amplifier AMP2 goes high and the circuit 400 is allowed to turn off the MOSFET M7 and turn on the MOSFET M6.

In use, the control circuit 410 is used to generate the threshold signal Ith and the Itrip_ok signal. During the soft start, the voltage source Vss starts from zero volts and ramps up linearly at one of the positive inputs of the first amplifier AMP1. If this voltage is lower than the other positive input (e.g. 0.6V), a similar ramp voltage appears across the resistor Rss. Hence, a current determined by Vss/Rss is generated and flows through the MOSFET M5 and the MOSFET M1. However, if the voltage Vss is greater than 0.6V, for example, the voltage across the resistor Rss is clamped at 0.6V, creating a fixed current of 0.6/Rss.

The current created through the resistor Rss is mirrored by the MOSFET M2 and flows toward the current source Iss. Current subtraction thus occurs and the net result flows through the MOSFET M3. Thereafter, current flowing via the MOSFET M3 is as follows: Iss−Vss/Rss, and is then mirrored by the MOSFET M4 into the resistor R1, creating the threshold signal Ith. The threshold signal Ith exhibits an inverse relationship to the voltage Vss. As the voltage Vss ramps up, the threshold voltage Ith ramps down.

Figure 5:
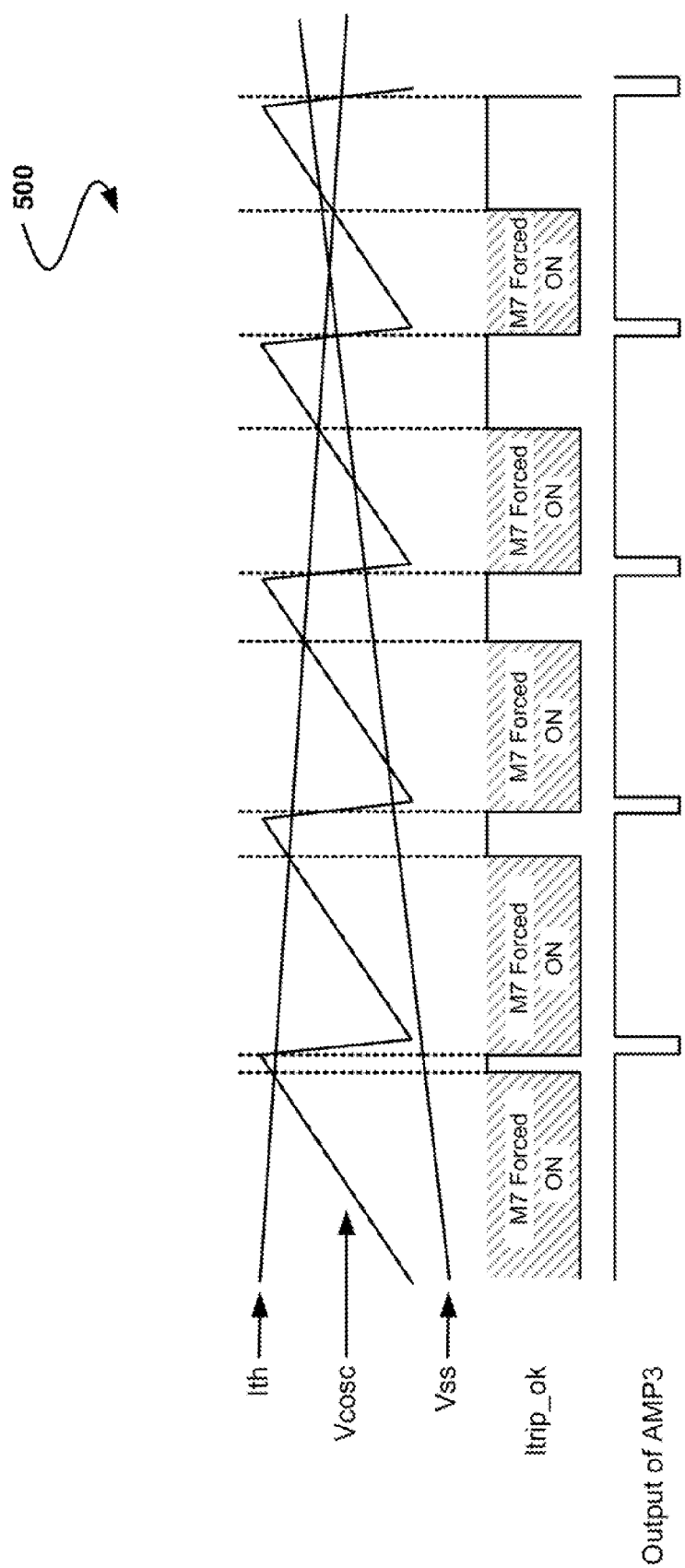
FIG. 5 is a timing diagram showing various signals present in the circuit of FIG. 4 over time.

FIG. 5 is a timing diagram 500 showing various signals present in the circuit 400 of FIG. 4 over time. For example, the present timing diagram 500 may represent operation of the circuit 400 of FIG. 4. Of course, however, the present timing diagram 500 may be implemented using any desired circuit. Again, the aforementioned definitions may apply during the present description.

As shown, the threshold signal Ith ramps down in a manner that is opposite of the voltage source Vss. Further, the Itrip_ok signal is shown to be triggered upon a pulse of the oscillator voltage Vcosc exceeding the threshold signal Ith. Further, a falling edge of the Itrip_ok signal is shown to be triggered upon the poise of the oscillator voltage Vcosc falling below the threshold signal Ith. Since the threshold signal Ith ramps down in tire manner shown, a duration of the Itrip_ok signal lengthens in a corresponding manner.

In use, the MOSFET M6 is turned on and the MOSFET M7 is turned off, in response to a leading edge of the Itrip_ok signal. Since the duration of the Itrip_ok signal progressively lengthens over time (as shown), the duration during which the MOSFET M7 is turned on shortens in a reciprocal manner. Since such duration is decreased in such manner, the in-rush current is further reduced.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A circuit, comprising:
   an output stage including a first transistor and a second transistor, wherein the first transistor is connected to a voltage source, the first transistor and the second transistor are interconnected at an output; and
   a control circuit in communication with the output stage, the control circuit capable of controlling a duration during which the second transistor is turned on to shorten the duration gradually for reducing an in-rush current,
   wherein the control circuit is configured to gradually shorten the duration during which the second transistor is turned on thereby reducing the in-rush current,
   wherein the control circuit includes a control circuit comparator, wherein the control circuit comparator controls when an oscillator comparator communicates with the output stage, wherein the control circuit comparator includes a first input for receiving a ramp down signal, and wherein the control circuit comparator includes a second input for receiving a saw tooth signal.

2. The circuit of claim 1, wherein the control circuit comparator includes an operational amplifier.

3. The circuit of claim 1, wherein the control circuit comparator matches an oscillator comparator in communication with the output stage for generating an oscillating signal.

4. The circuit of claim 1, wherein the control circuit comparator controls when the oscillator comparator communicates with the output stage, utilizing a NAND gate.

5. The circuit of claim 1, wherein the saw tooth signal is generated by a capacitor associated with the oscillator comparator.

6. The circuit of claim 1, wherein the output stage is a component of a regulator.

7. The circuit of claim 6, wherein the regulator includes a direct current switching regulator.

8. The circuit of claim 7, wherein the drains of the first transistor and the second transistor are interconnected at the output.

9. The circuit of claim 1, wherein current flows towards the output when the first transistor is on and the second transistor is off, wherein current flowing through the output decays when the second transistor is on.

10. The circuit of claim 1, wherein at least one of the first transistor and the second transistor are selected from a group consisting of a p-type transistor, an n-type transistor, and a MOSFET transistor.

11. The circuit of claim 1, wherein gates of the first transistor and the second transistor are interconnected to a common node, wherein a voltage applied to the common node selectively turns the first transistor off or on and turns the second transistor to an opposite state as the first transistor.

12. A method, comprising:

driving an output stage including a first transistor and a second transistor, wherein the first transistor is connected to a voltage source, the first transistor and the second transistor are interconnected at an output; and using a control circuit for controlling a duration during which the second transistor is turned on for reducing an in-rush current, wherein the duration which the second transistor is turned on is gradually shortened thereby reducing the in-rush current, wherein current flowing through the output increases when the second transistor is off and decays when the second transistor is on, wherein the control circuit includes a control circuit comparator, wherein the control circuit comparator controls when an oscillator comparator communicates with the output stage, wherein the control circuit comparator includes a first input for receiving a ramp down signal, and wherein the control circuit comparator includes a second input for receiving a saw tooth signal.

13. The method of claim 12, wherein the control circuit comparator includes an operational amplifier.

14. The method of claim 12, wherein the control circuit comparator matches an oscillator comparator in communication with the output stage for generating an oscillating signal.

15. The method of claim 12, wherein the control circuit comparator controls when the oscillator comparator communicates with the output stage, utilizing a NAND gate.

16. The method of claim 12, wherein the saw tooth signal is generated by a capacitor associated with the oscillator comparator.

17. The method of claim 12, wherein the output stage is a component of a regulator, wherein gates of the first transistor and the second transistor are interconnected, wherein a voltage commonly applied to the gates turns the first transistor off and the second transistor on.

18. The method of claim 17, wherein the regulator includes a switching regulator.

19. The method of claim 18, wherein the regulator includes a direct current switching regulator.

20. The method of claim 12, wherein drains of the first transistor and the second transistor are interconnected at the output.

21. The method of claim 12, wherein current flowing through the second transistor causes a change in an output of a first comparator of the output stage.

22. The method of claim 12, wherein at least one of the first transistor and the second transistor is selected from a group consisting of a MOSFET transistor, an n-type transistor and a p-type transistor.

23. A circuit, comprising:

a regulator circuit including a first comparator and an output stage including a first transistor and a second transistor, wherein the first transistor is connected to a voltage source, and the first transistor and the second transistor are interconnected at an output, wherein gates of the first transistor and the second transistor are connected to a common node; and a control circuit in communication with the regulator circuit and including a second comparator, the control circuit being configured to control a duration during which the first transistor is turned off and the second transistor is turned on to shorten the duration gradually for reducing an in-rush current, wherein a voltage applied to the common node selectively turns the first transistor off or on and the second transistor to an opposite state as the first transistor, wherein current flowing through the output increases when the second transistor is off and decays when the second transistor is on, wherein current flowing through the second transistor causes a change in an output of the first comparator, and wherein the second comparator controls when an oscillator comparator communicates with the output stage and includes a first input for receiving a ramp down signal and a second input for receiving a saw tooth signal.

* * * * *